(12) United States Patent
Sasaki et al.

(10) Patent No.: US 11,167,745 B2
(45) Date of Patent: Nov. 9, 2021

(54) CONTROL SYSTEM OF HYBRID VEHICLE

(71) Applicant: TOYOTA JIDOSHA KABUSHIKI KAISHA, Toyota (JP)

(72) Inventors: Keisuke Sasaki, Susono (JP); Satoshi Tsuda, Gotemba (JP); Naoto Kato, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 267 days.

(21) Appl. No.: 16/279,093

(22) Filed: Feb. 19, 2019

(65) Prior Publication Data

US 2019/0322269 A1   Oct. 24, 2019

(30) Foreign Application Priority Data

Apr. 19, 2018  (JP) .............................. JP2018-080855
Dec. 7, 2018   (JP) .............................. JP2018-230372

(51) Int. Cl.
*B60W 20/13*    (2016.01)
*B60W 10/06*    (2006.01)
*B60W 10/08*    (2006.01)

(52) U.S. Cl.
CPC ............ *B60W 20/13* (2016.01); *B60W 10/06* (2013.01); *B60W 10/08* (2013.01);
(Continued)

(58) Field of Classification Search
CPC ... B60K 1/00; B60K 1/02; B60K 1/04; B60K 3/00; B60K 3/02; B60K 5/08; B60K 6/00; B60K 6/20; B60K 6/22; B60K 6/24; B60K 6/26; B60K 2006/266; B60K 6/28; B60K 6/40; B60K 6/42; B60K 6/448; B60K 7/00; B60K 7/0007; B60K 16/00;
(Continued)

(56) References Cited

U.S. PATENT DOCUMENTS 3,791,473 A * 2/1974 Rosen ................... B60K 6/485
                                              180/65.26
2010/0108028 A1* 5/2010 Aso .......................... F02D 41/10
                                              123/339.11
(Continued)

FOREIGN PATENT DOCUMENTS

JP    2010-202132 A    9/2010
JP    2017-206108 A   11/2017

*Primary Examiner* — James J Lee
*Assistant Examiner* — Alexander George Matta
(74) *Attorney, Agent, or Firm* — Oliff PLC

(57) ABSTRACT

A control system of a hybrid vehicle includes an internal combustion engine loaded on a vehicle, an electric motor loaded on the vehicle, and connected to wheels via a power transmission mechanism, a battery storing power that drives the electric motor, and a control device that controls engine torque generated by the internal combustion engine, and motor torque transmitted to the wheels by the electric motor. The control device calculates an outputable power of the battery based on a temperature and a state of charge of the battery. The control device is configured to make a torque change amount of the engine torque larger when the calculated outputable power belongs to a predetermined low power region than when the outputable power belongs to a high power region with higher power than the low power region.

8 Claims, 9 Drawing Sheets

(52) U.S. Cl.
CPC . *B60W 2510/244* (2013.01); *B60W 2510/246* (2013.01); *B60W 2710/0666* (2013.01); *B60W 2710/083* (2013.01)

(58) Field of Classification Search
CPC ............ B60K 2016/006; B60K 17/356; B60K 2702/04; B60K 2702/06; B60K 2704/00; B60K 31/10; B60K 31/102; B60K 25/00; B60K 2025/005; B60L 7/10; B60L 7/16; B60L 7/18; B60L 7/20; B60L 15/00; B60L 15/007; B60L 15/20; B60L 15/2045; B60L 50/00; B60L 50/10; B60L 50/50; B60L 50/60; B60L 50/61; B60L 50/64; B60L 53/20; B60L 53/22; B60L 53/24; B60L 58/10; B60L 58/12; B60L 58/16; B60L 58/24; B60L 58/25; B60L 58/40; B60L 2240/10; B60L 2240/14; B60L 2240/36; B60L 2240/42; B60L 2240/423; B60L 2240/425; B60L 2240/427; B60L 2240/44; B60L 2240/441; B60L 2240/443; B60L 2240/445; B60W 10/00; B60W 10/04; B60W 10/06; B60W 10/08; B60W 10/24; B60W 10/26; B60W 10/28; B60W 20/00; B60W 20/10; B60W 20/11; B60W 20/13; B60W 20/14; B60W 20/15; B60W 20/19; B60W 20/20; B60W 20/40; B60W 30/00; B60W 30/02; B60W 30/025; B60W 30/188; B60W 30/1882; B60W 2510/00; B60W 2510/06; B60W 2510/0638; B60W 2510/0657; B60W 2510/0661; B60W 2510/08; B60W 2510/083; B60W 2510/084; B60W 2510/087; B60W 2510/24; B60W 2510/242; B60W 2510/244; B60W 2510/246; B60W 2510/28; B60W 2510/285; B60W 2710/00; B60W 2710/06; B60W 2710/0666; B60W 2710/0672; B60W 2710/08; B60W 2710/083; B60W 2710/085; B60W 2710/088; B60W 2520/10; B60W 2540/10; Y02E 60/10; Y02T 10/62; Y02T 10/70; Y02T 10/7072; Y02T 10/92; Y02T 90/167; Y02T 10/80
See application file for complete search history.

(56) References Cited

U.S. PATENT DOCUMENTS

| | | | | |
|---|---|---|---|---|
| 2010/0121513 | A1* | 5/2010 | Itoh | B60K 6/448 701/22 |
| 2010/0312422 | A1* | 12/2010 | Imaseki | B60K 6/52 701/22 |
| 2011/0313602 | A1* | 12/2011 | Hirata | B60K 6/48 701/22 |
| 2013/0311025 | A1* | 11/2013 | Tagawa | B60W 10/08 701/22 |
| 2015/0151737 | A1* | 6/2015 | Birch | B60W 50/087 701/22 |
| 2016/0318385 | A1* | 11/2016 | Terayama | B60K 6/52 |
| 2017/0334420 | A1 | 11/2017 | Kato et al. | |
| 2018/0171882 | A1* | 6/2018 | Kim | F02D 41/2422 |
| 2019/0263379 | A1* | 8/2019 | Chikkannanavar | B60W 10/06 |

\* cited by examiner

CONTROL SYSTEM OF HYBRID VEHICLE

CROSS-REFERENCE TO RELATED APPLICATION

The present disclosure claims priority under 35 U.S.C. § 119 to Japanese Patent Applications No. 2018-080855, filed on Apr. 19, 2018, and No. 2018-230372, filed on Dec. 7, 2018. The contents of these applications are incorporated herein by reference in their entirety.

FIELD

The present disclosure relates to a control system of a hybrid vehicle.

BACKGROUND

Patent Literature 1 (Japanese Patent Laid-Open No. JP 2017-206108 A) discloses an art for suppressing driving force shortage in a hybrid automobile. In the art, the engine speed is controlled to a target speed by using a smaller rate value as the temperature of the battery is lower when the engine speed is increased. Thereby, the engine speed increases slowly when the battery temperature is low, so that the driving force shortage is suppressed.

SUMMARY

However, the above described conventional art has the following problem. That is, although in the above described conventional art, the driving force shortage is suppressed, the rate value for changing the engine speed is set at a smaller rate value as the temperature of the battery is lower. Under a low temperature environment where the temperature of the battery lowers, an outputable power of the battery is reduced. Therefore, in the above described conventional art, responsiveness of acceleration performance of the vehicle is likely to be worsened in the situation where the outputable power of the battery is reduced like this.

The present disclosure is made in the light of the problem as described above, and has an object to provide a control system of a hybrid vehicle capable of suppressing worsening of the acceleration performance of the vehicle in a situation where outputable power of a battery is reduced.

In order to attain the above described object, a first disclosure is directed to a control system of a hybrid vehicle including an internal combustion engine loaded on a vehicle, an electric motor loaded on the vehicle and connected to wheels via a power transmission mechanism, a battery that stores power that drives the electric motor, and a control device that controls engine torque generated by the internal combustion engine, and motor torque that is transmitted to the wheels by the electric motor, based on a request driving force requested for the vehicle. The control device calculates an outputable power of the battery based on a temperature of the battery and a state of charge of the battery. The control device is configured to make a torque change amount of the engine torque larger when the outputable power belongs to a predetermined low power region than when the outputable power belongs to a high power region with a higher power than the low power region.

A second disclosure further has the following feature in the first disclosure.

The control device is configured to compensate torque, which becomes insufficient by the engine torque, by the motor torque so that a driving force of the vehicle is brought close to the request driving force.

A third disclosure further has the following feature in the first disclosure.

The battery has a characteristic in that as the temperature of the battery is higher, the outputable power has a larger value.

A fourth disclosure further has the following feature in the first disclosure.

The battery has a characteristic in that as the state of charge of the battery is larger, the outputable power has a larger value.

A fifth disclosure further has the following feature in the first disclosure

The control device is configured to make a torque change amount of the engine torque smaller when the outputable power of the battery is larger than a prescribed determination value than when the outputable power is smaller than the determination value.

A sixth disclosure further has the following feature in the first disclosure

The control device is configured to make a torque change amount of the engine torque smaller as the outputable power of the battery becomes larger.

A seventh disclosure further has the following feature in the first disclosure.

The control device is configured to make a torque change amount of the engine torque be a fixed positive value when the outputable power of the battery is larger than a prescribed determination value.

An eighth disclosure further has the following feature in the first disclosure.

The control device is configured to fix a torque change amount of the engine torque to zero when the outputable power of the battery is larger than a prescribed determination value.

According to the first disclosure, when the outputable power of the battery belongs to the low power region, the torque change amount of the engine torque is made larger as compared with the case where the outputable power of the battery belongs to the high power region. Thereby, even in the situation where output of the electric motor by the battery cannot be expected, it becomes possible to suppress worsening of the acceleration performance of the vehicle.

According to the second disclosure, an insufficient amount of the request driving force which becomes insufficient by the engine torque is compensated by the motor torque. Thereby, even when the torque change amount of the engine torque is decreased, it becomes possible to bring the driving force of the vehicle close to the request driving force.

According to the third disclosure, the battery has the characteristic in that as the temperature of the battery is higher, the outputable power has a larger value. Therefore, according to the third disclosure, it becomes possible to enhance torque responsiveness by increasing the ratio of the motor torque as the temperature of the battery is higher.

According to the fourth disclosure, the battery has the characteristic in that the outputable power has a larger value as the state of charge of the battery is larger. Therefore, according to the fourth disclosure, it becomes possible to enhance torque responsiveness by increasing the ratio of the motor torque as the state of charge of the battery is larger.

According to the fifth disclosure, when the outputable power of the battery is larger than the determination value, the torque change amount of the engine torque is made smaller as compared with the torque change amount at the time of the outputable power is smaller than the determination value. Thereby, even under the situation where output of the electric motor by the battery cannot be expected, it becomes possible to restrain torque responsiveness of the vehicle from being worsened.

According to the sixth disclosure, as the outputable power of the battery becomes larger, the torque change amount of the engine torque is made smaller. As the outputable power of the battery becomes larger, the output performance of the battery is enhanced. Therefore, according to the present disclosure, as the output performance of the battery becomes higher, the ratio of the engine torque is decreased to be able to shift to traveling mainly by using the motor torque.

According to the seventh disclosure, when the outputable power of the battery is larger than the determination value, the torque change amount of the engine torque is controlled to be at a fixed positive value. Thereby, the engine torque can be always used, so that it becomes possible to provide effective control in the system on the premise that the internal combustion engine is always used.

According to the eighth disclosure, when the outputable power of the battery is larger than the determination value, the torque change amount of the engine torque is controlled to zero. Thereby, it becomes possible to perform travel with priority being put on the acceleration performance of the vehicle by EV (electric vehicle) travel using only the motor torque, in the range where the outputable power of the battery is larger than the determination value.

DESCRIPTION OF EMBODIMENT

Hereinafter, an embodiment of the present disclosure will be described with reference to the drawings. Note that when the numerals of the numbers, the quantities, the amounts, the ranges and the like of the respective elements are mentioned in the embodiments shown as follows, the present disclosure is not limited to the mentioned numerals unless specially explicitly described otherwise, or unless the disclosure is explicitly specified by the numerals theoretically. Further, the structures, steps and the like that are described in the embodiments shown as follows are not always indispensable to the disclosure unless specially explicitly shown otherwise, or unless the disclosure is explicitly specified by the structures, steps and the like theoretically.

First Embodiment

1. Configuration of First Embodiment

Figure 1:
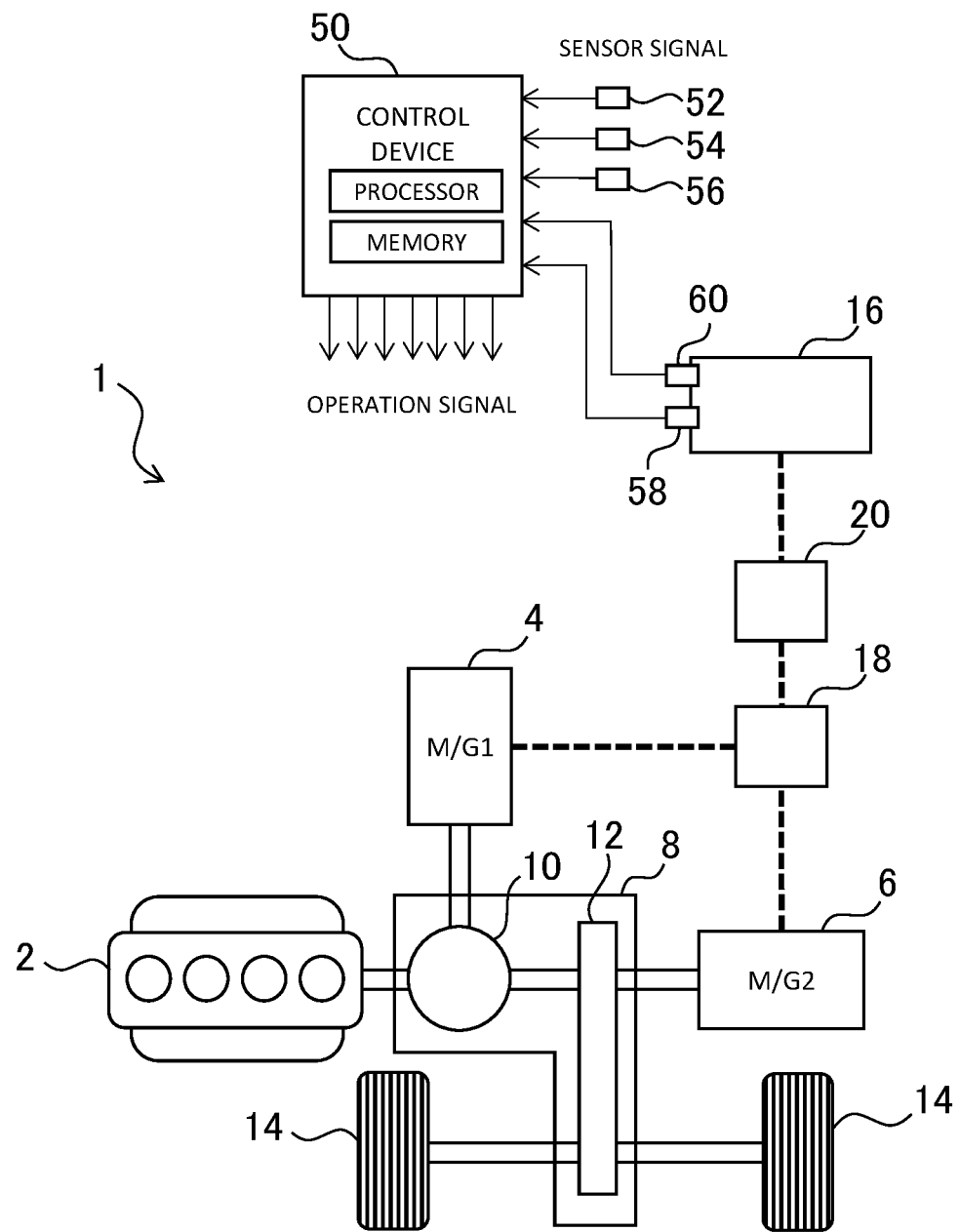
FIG. 1 is a diagram illustrating a configuration of a control system of a hybrid vehicle according to a first embodiment.

FIG. 1 is a diagram illustrating a configuration of a control system of a hybrid vehicle according to a first embodiment. A vehicle 1 illustrated in FIG. 1 is a split type hybrid vehicle including a plurality of power plants. More particularly, the vehicle 1 includes an engine 2 as one power plant for rotationally driving wheels 14. The engine 2 is an internal combustion engine that outputs motive power by combustion of hydrocarbon fuel such as gasoline or light oil, and includes an intake device, an exhaust device, a fuel injection device, an ignition device, a cooling device and the like.

The vehicle 1 includes a first motor generator 4 and a second motor generator 6 that are electric motors capable of generating power, as another power plant for rotationally driving the wheels 14. The first motor generator 4 and the second motor generator 6 are alternating current synchronous generator-motors having both a function as an electric motor that outputs torque by supplied electric power, and a function as a generator that converts inputted mechanical power into electric power. The first motor generator 4 is mainly used as a generator, and the second motor generator is mainly used as an electric motor.

The engine 2, the first motor generator 4 and the second motor generator 6 are connected to the wheels 14 by a power transmission mechanism 8. The power transmission mechanism 8 includes a power distribution mechanism 10 and a deceleration mechanism 12. The power distribution mechanism 10 is a planetary gear unit, for example, and divides torque that is outputted from the engine 2 to the first motor generator 4 and the wheels 14. The torque which is outputted from the engine 2 or torque that is outputted from the second motor generator 6 is transmitted to the wheels 14 via the deceleration mechanism 12.

The first motor generator 4 regeneratively generates power by torque supplied via the power distribution mechanism 10. In a state where torque is not outputted from the engine 2 and the second motor generator 6, power regeneration by the first motor generator 4 is performed, whereby a regenerative braking force is transmitted to the wheels 14 via the power transmission mechanism 8 from the first motor generator 4, and the vehicle 1 decelerates. That is, the vehicle 1 can perform regenerative braking by the first motor generator 4.

The first motor generator 4 and the second motor generator 6 give and receive power to and from a battery 16 via an inverter 18 and a convertor 20. The inverter 18 is designed to be able to cause power generated by either one of the first motor generator 4 and the second motor generator 6 to be consumed by the other one. The inverter 18 converts power stored in the battery 16 into an alternating current from a direct current and supplies the power to the second motor generator 6, and converter 20 converts the power generated by the first motor generator 4 into a direct current from an alternating current to store the power in the battery 16. Therefore, the battery 16 is charged and discharged by power that is generated or by insufficient power in either the first motor generator 4 or the second motor generator 6.

The vehicle 1 includes a control device 50 that controls travel of the vehicle by controlling operations of the engine 2, the first motor generator 4, the second motor generator 6, the power distribution mechanism 10 and the like. The control device 50 is an ECU (Electronic Control Unit) having at least one processor and at least one memory. In the memory, various programs for travel control of the vehicle 1 and various data, including maps, are stored. The programs stored in the memory are executed by the processor, whereby the control device 50 is caused to realize various functions. Intake air amount control, fuel injection control, ignition timing control and the like of the engine 2 are performed by the control device 50. Motoring control to cause the first motor generator 4 and the second motor generator 6 to function as electric motors and regeneration control that causes the first motor generator 4 and the second motor generator 6 to function as generators are performed by the control device 50. Note that the control device 50 may be configured by a plurality of ECUs.

The control device 50 takes in signals of sensors included in the vehicle 1 and processes the signals. The sensors are attached to respective places of the vehicle 1. A rotational speed sensor 52 that detects a rotational speed of a crankshaft, an accelerator position sensor 54 that outputs a signal corresponding to a depression amount of an accelerator pedal as an accelerator opening degree, a vehicle speed sensor 56 that detects a vehicle speed and the like are also attached to the vehicle 1. Further, a temperature sensor 58 that detects a battery temperature, and an SOC (State of Charge) sensor 60 that detects a battery state of charge (SOC) are attached to the battery 16. Note that a lot of sensors are connected to the control device 50 other than the sensors illustrated in the drawings, but explanation of the other sensors is omitted in the present description. The control device 50 executes various programs by using the sensor signals that are taken in, and outputs operation signals for operating actuators.

2. Operation of First Embodiment

Control of the vehicle 1 performed by the control device 50 includes torque control that controls torque transmitted to the wheels 14. The torque control in this case, engine torque Te and motor torque Tm are controlled so that a driving force that is transmitted to the wheels 14 becomes a request driving force.

The engine torque Te is torque that is generated by the engine 2. The control device 50 performs intake air amount control, fuel injection control and ignition timing control of the engine 2 so that the engine torque Te becomes a target engine torque.

The motor torque Tm is torque that is transmitted to the wheels 14 from the first motor generator 4 or the second motor generator 6. The motor torque Tm is configured mainly by torque that is outputted from the second motor generator 6. However, at a time of deceleration at which a regenerative braking force of the first motor generator 4 is transmitted to the wheels 14, the motor torque Tm may be configured by including negative torque that is outputted from the first motor generator 4. The control device 50 performs motoring control and regeneration control of the first motor generator 4 and the second motor generator 6 so that the motor torque Tm becomes a target motor torque.

Here, it is known that the motor torque Tm has more excellent torque responsiveness than the engine torque Te due to characteristics of the motor torque Tm. Therefore, from a viewpoint of acceleration performance of the vehicle, a degree of use of the motor torque Tm is preferably enhanced by restricting the engine torque Te. However, on the other hand, it is also known that output performance of the battery 16 is reduced under a low temperature environment at 0° or less, for example. Therefore, if the degree of use of the motor torque Tm is increased under the low temperature environment like this, the request driving force is unlikely to be exhibited with high responsiveness.

Figure 2:
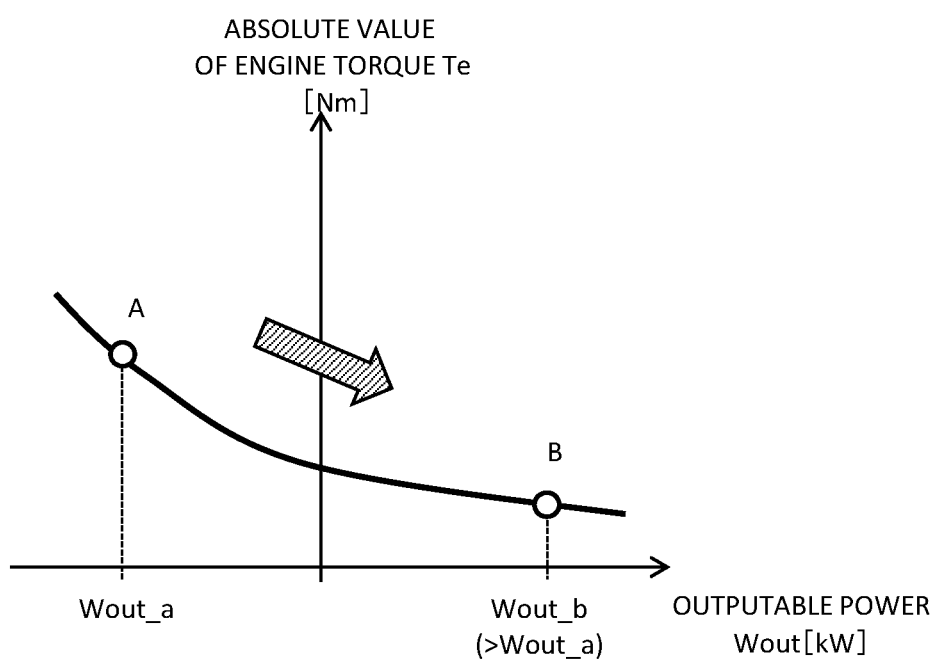
FIG. 2 is a diagram illustrating a change of an absolute value of an engine torque Te to an outputable power, Wout, of the battery.

As torque control for exhibiting the request driving force under the low temperature environment, torque absolute value control that controls an absolute value of the engine torque Te in response to outputable power Wout of the battery 16 is conceivable, for example. FIG. 2 is a diagram illustrating a change of the absolute value of the engine torque Te to the outputable power, Wout, of the battery. In FIG. 2, outputable power of a state A belonging to a predetermined lower power region is set as Wout_a, and an outputable power of a state B belonging to a predetermined high power region with a higher power than the low power region is set as Wout_b. In the torque absolute control illustrated in the drawing, a torque absolute value of the engine torque Te in the state A is controlled to be larger than a torque absolute value in the state B. According to the control like this, the absolute value of the engine torque Te is made larger in the state A than in the state B, so that it becomes possible to satisfy the request driving force of the vehicle under the low temperature environment or under a situation of low SOC where the outputable power of the battery 16 is reduced.

Figure 3:
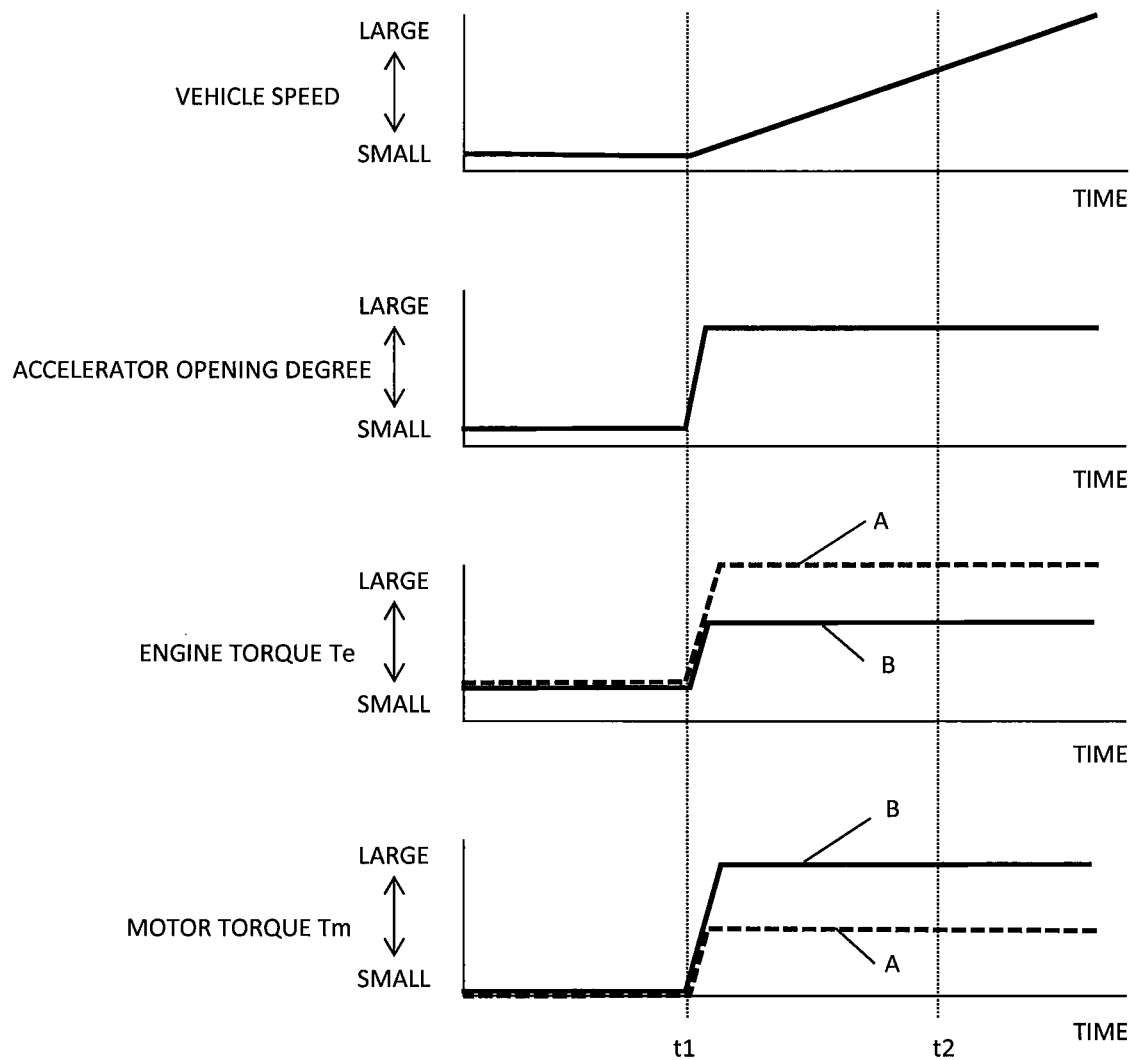
FIG. 3 is a time chart illustrating an operation of torque absolute value control.

However, the above described torque absolute value control has the following problem. FIG. 3 is a time chart illustrating an operation of torque absolute value control. Note that in FIG. 3, a chart in a first tier illustrates a change with time of the vehicle speed, a chart in a second tier illustrates a change with time of the accelerator opening degree, a chart in a third tier illustrates a change with time of the engine torque Te, and a chart in a fourth tier illustrates a change with time of the motor torque Tm, respectively. Further, in FIG. 3, changes of various state quantities in the state A are illustrated by chain lines, and changes of various state quantities in the state B are illustrated by solid lines.

In the torque absolute value control illustrated in FIG. 3, a case where a driver requests abrupt acceleration of the vehicle by depressing the accelerator pedal at a time point t1 is illustrated. When the accelerator opening degree changes to increase, the engine torque Te and the motor torque Tm change to increase respectively to realize a request driving force corresponding to the accelerator opening degree.

When the state A and the state B are compared, the absolute value of the engine torque Te is made smaller in the state B than in the state A. In an ordinary gasoline engine, a maximum efficiency point is set in an operation region with a relatively high load. Therefore, when the absolute value of the engine torque Te is set to be small as in the state B, engine efficiency is reduced to cause worsening of fuel efficiency. Further, in the torque absolute value control, in a period of the state B where the absolute value of the engine torque Te is set to be small, the motor torque Tm is increased to satisfy the request driving force. Therefore, in a situation where the state B continues for a long period of time, a burden on the battery 16 increases, and the state of charge of the battery (SOC; State of Charge) is likely to be reduced significantly.

Therefore, the system of the first embodiment solves the above described problem by executing torque rate control that controls a torque change amount (hereinafter, also may be referred to as "torque rate") of the engine torque Te in response to the outputable power Wout. Hereinafter, with reference to FIG. 4 to FIG. 6, the torque rate control of the first embodiment will be described further in detail.

Figure 4:
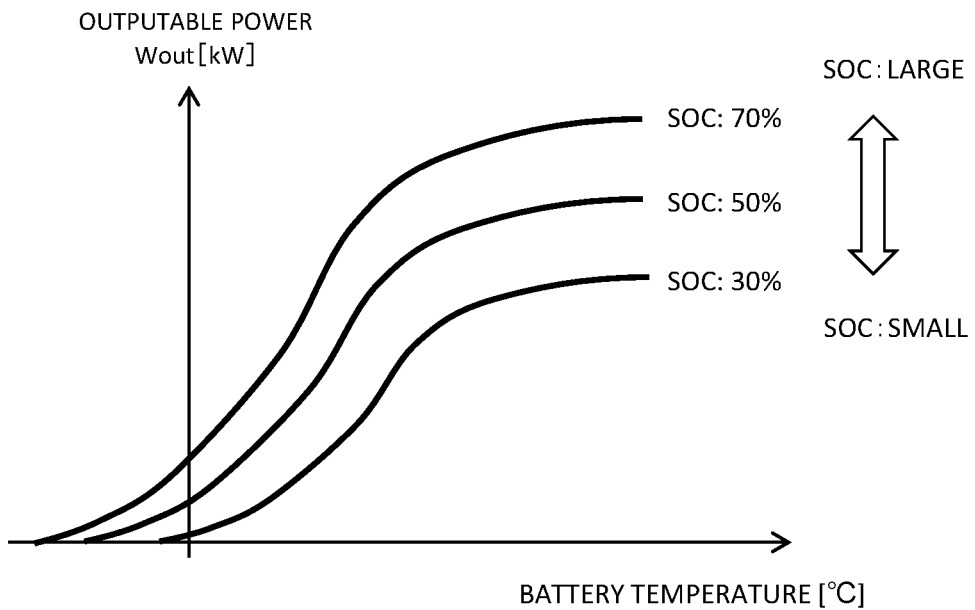
FIG. 4 is a diagram illustrating an output characteristic of a battery.

FIG. 4 is a diagram illustrating an output characteristic of the battery. As illustrated in the drawing, the battery 16 has a characteristic in that as a battery temperature [° C.] is higher, the outputable power Wout [kW] becomes larger. Further, the battery 16 has a characteristic in that as the battery state of charge (SOC) [%] is larger, the outputable power Wout becomes larger.

Figure 5:
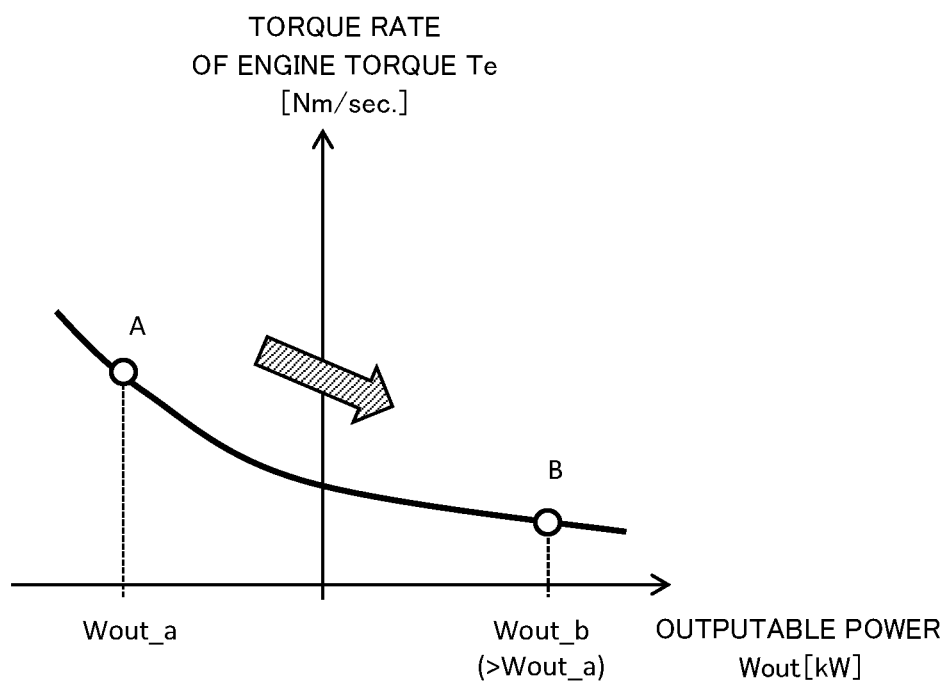
FIG. 5 is a diagram illustrating a change of a torque rate of an engine torque Te to the outputable power, Wout, of the battery.
Figure 6:
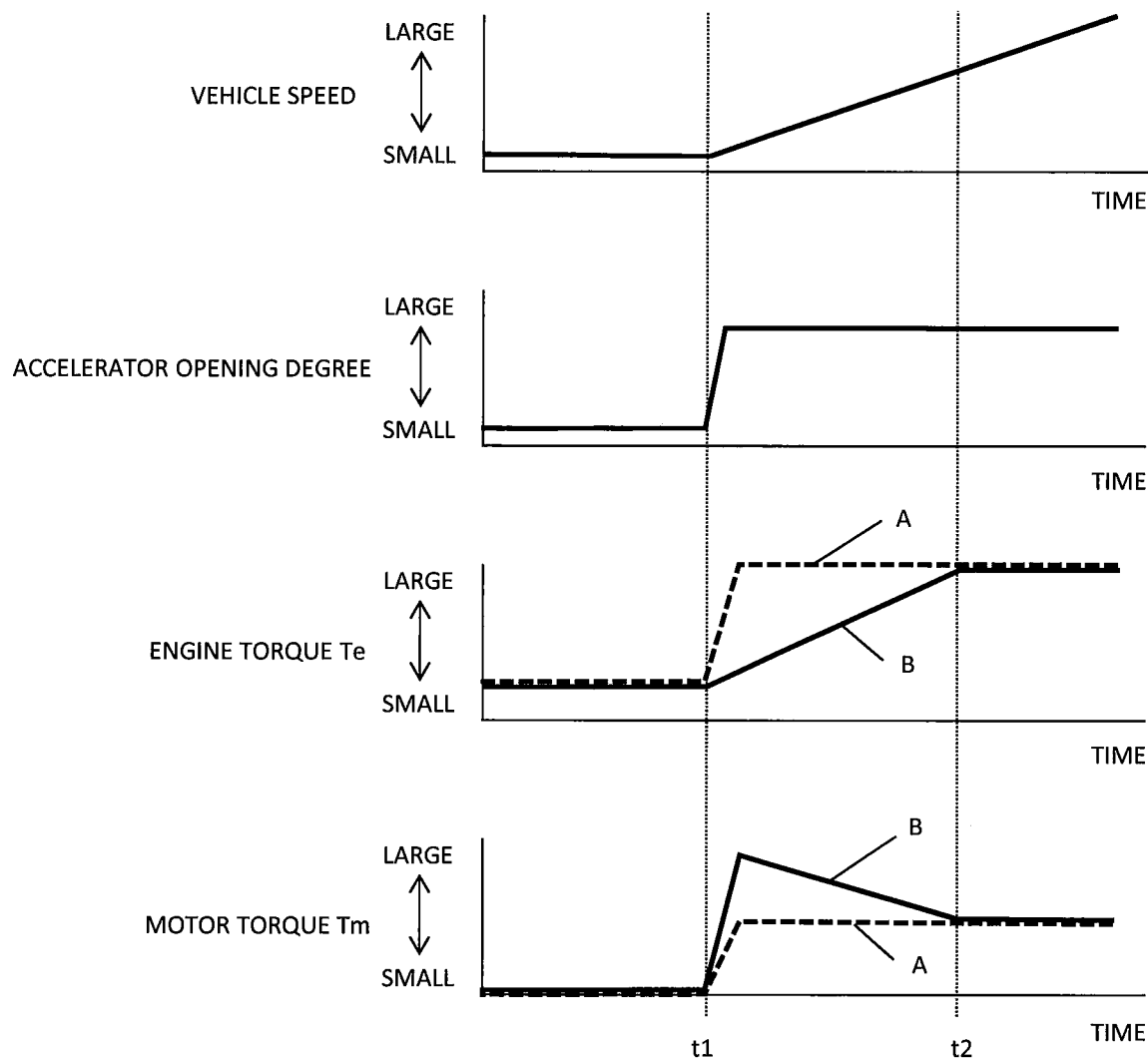
FIG. 6 is a time chart illustrating an operation of torque rate control.

FIG. 5 is a diagram illustrating a change of a torque rate of the engine torque Te to the outputable power, Wout, of the battery. In FIG. 5, the outputable power in the state A belonging to a predetermined lower power region is set as Wout_a, whereas the outputable power in the state B belonging to a predetermined high power region having higher power than the low power region is set as Wout_b. Further, FIG. 6 is a time chart illustrating an operation of torque rate control. Note that in FIG. 6, a chart in a first tier illustrates a change with time of the vehicle speed of the vehicle, a chart in a second tier illustrates a change with time of the accelerator opening degree, a chart in a third tier illustrates a change with time of the engine torque Te, and a chart in a fourth tier illustrates a change with time of the motor torque Tm, respectively. Further, FIG. 6 illustrates changes of various state quantities in the state A by chain lines, and illustrates changes of various state quantities in the state B by solid lines.

In the torque rate control in the first embodiment, the torque rate of the engine torque Te in the state A is controlled to be larger than the torque rate in the state B. Under a low temperature environment or under a situation of low SOC of the battery 16, the outputable power Wout of the battery 16 is reduced. According to the torque rate control of the first embodiment, the engine torque Te increases with better responsiveness in the state A than in the state B, so that it becomes possible to suppress worsening of torque responsiveness of the vehicle even in the situation where the outputable power Wout of the battery 16 is reduced.

Further, in the torque rate control of the first embodiment, control of compensating the torque amount that becomes insufficient by decreasing the torque rate of the engine torque Te, by the motor torque Tm is performed. In the chart illustrated in FIG. 6, the motor torque Tm is set so that a total value of the engine torque Te and the motor torque Tm comes closer to the request driving force. In the torque rate control of the first embodiment, the torque rate of the engine torque Te is controlled to be smaller as the outputable power Wout increases to Wout_b (>Wout_a) from Wout_a. According to the control like this, it becomes possible to decrease the torque rate of the engine torque Te as the output performance of the battery 16 increases, and compensate an insufficient torque amount by the motor torque Tm with high torque responsiveness.

Further, as illustrated in FIG. 6, in the torque rate control of the first embodiment, even in the state B, the absolute value of the engine torque Te increases to be equivalent to that in the state A. Therefore, even if the state B continues for a long period of time, an operation with reduced engine efficiency can be prevented from being continued. Further, in the torque rate control of the first embodiment, the motor torque Tm abruptly increases once immediately after the time point t1 in the state B, but decreases to be equivalent to that in the state A thereafter. Therefore, it becomes possible to restrain the battery state of charge from being significantly reduced even if the state B continues for a long period of time.

In this way, according to the torque rate control of the first embodiment, even in the situation where the outputable power of the battery 16 is reduced, it becomes possible to restrain reduction in acceleration responsiveness of the vehicle.

3. Specific Processing of First Embodiment

Figure 7:
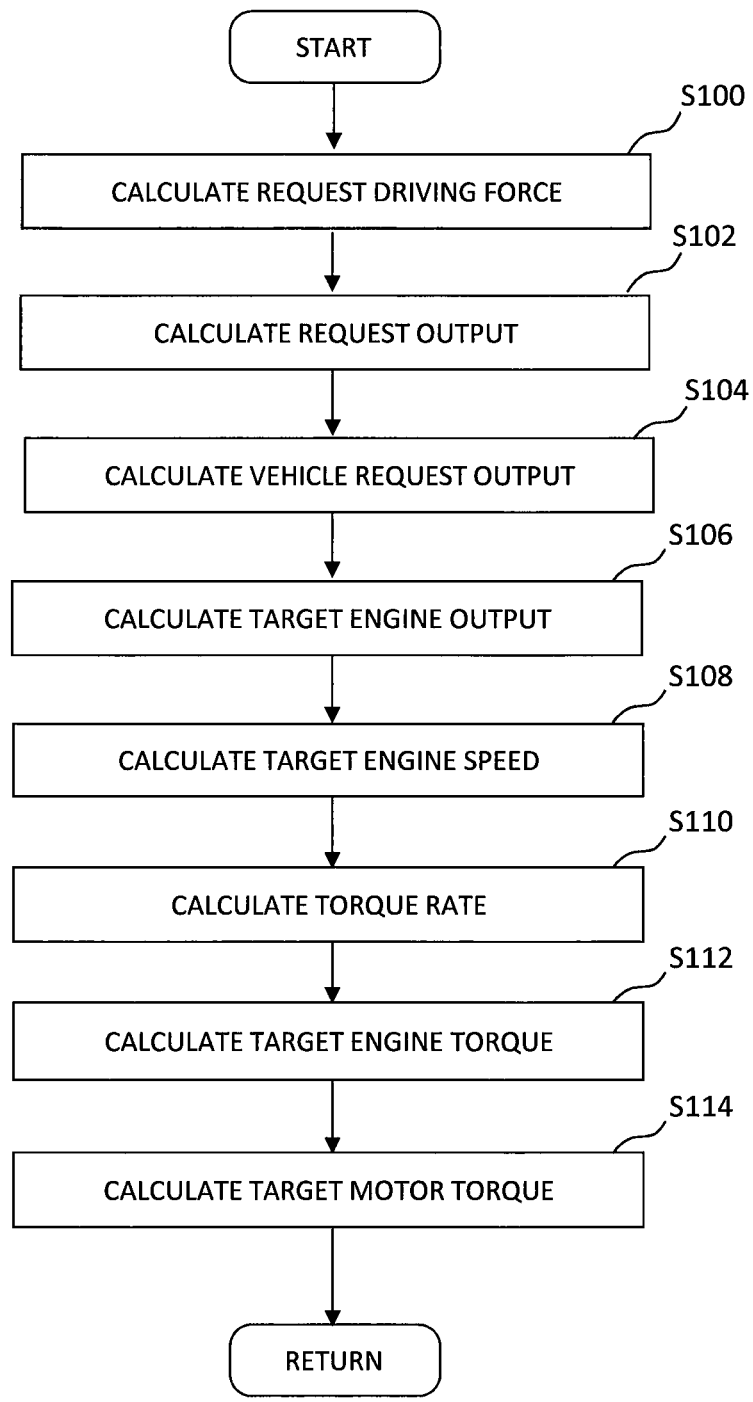
FIG. 7 is a flowchart illustrating a routine for torque control that is executed by a control device of the first embodiment.

FIG. 7 is a flowchart illustrating a routine for torque control that is executed by the control device 50 of the first embodiment. A processor of the control device 50 executes a program shown by the flowchart at predetermined periods. Hereinafter, a content of the torque control of the first embodiment will be described along the flowchart.

In the flowchart illustrated in FIG. 7, the request driving force requested by the driver for the vehicle 1 is calculated first based on the accelerator opening degree detected by the accelerator position sensor 54 and the like (step S100). Next, a request output for realizing the request driving force is calculated based on the request driving force calculated in step S100 and the vehicle speed detected by the vehicle speed sensor 56 (step S102).

Next, a vehicle request output requested for the vehicle 1 is calculated (step S104). In this case, a value obtained by adding a charge and discharge request output determined from the charge and discharge request of the battery 16 to the request output is calculated as the vehicle request output. Next, a target engine output for realizing the vehicle request output is calculated based on the output ratio of the engine 2, and the first motor generator 4 and the second motor generator 6 (step S106). Next, a target engine speed is calculated (step S108). The memory of the control device 50 stores a map in which the engine speed, the engine torque, the engine output and the optimum fuel consumption rate is specified. In this case, by using the map, the engine speed at the time of the target engine output being realized by the optimum fuel consumption rate is calculated as the target engine speed.

Next, the torque rate is calculated (step S110). In this case, specifically, the battery temperature and the battery state of charge are detected first by the temperature sensor 58 and the SOC sensor 60. Subsequently, in accordance with the output characteristic of the battery 16 illustrated in FIG. 4, the outputable power corresponding to the detected battery temperature and battery state of charge is calculated. Subsequently, in accordance with the relationship between the outputable power and the torque rate, a torque rate corresponding to the calculated outputable power is calculated.

Next, by using the calculated torque rate, target engine torque that is a target value of the engine torque Te is calculated (step S112). Next, by subtracting the target engine torque from the request driving force, target motor torque that is a target value of the motor torque Tm is calculated (step S114).

Torque control corresponding to the output performance of the battery 16 can be performed by performing the torque control by using the target engine torque, the target engine speed and the target motor torque which are calculated in accordance with the procedures described above. Thereby, the torque rate at the time of the output performance of the battery 16 being low is increased, so that worsening of the acceleration performance of the vehicle at the time of the output performance of the battery 16 being low can be suppressed.

Incidentally, the present disclosure is not limited to the aforementioned first embodiment, but aspects that are modified as follows within the range without departing from the gist of the present disclosure can be adopted.

In the first embodiment, a split type hybrid vehicle capable of freely combining or dividing the torque from the engine 2, and the first motor generator 4 and the second motor generator 6 is described as an example. However, the vehicle 1 to which the control system of the first embodiment is applied may be a vehicle adopting another hybrid method. For example, the vehicle 1 may be a so-called parallel type hybrid vehicle using a plurality of power sources including an engine in drive of wheels.

The battery temperature usable in the torque rate control of the first embodiment is not limited to the detection value detected by the temperature sensor 58. That is, the battery temperature may be configured to be estimated by a known method from an outside temperature around the battery 16, load information of the battery 16, vehicle information after start, and information on an elapsed time period after start and the like.

Figure 8:
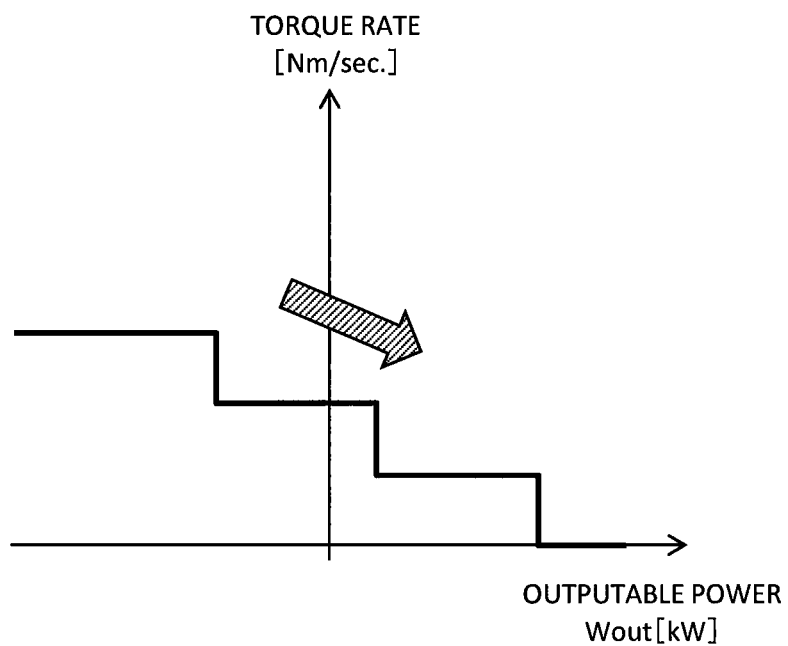
FIG. 8 is a diagram illustrating a modification of a setting method of the torque rate of the first embodiment.

Calculation of the torque rate is not limited to the method using the relationship illustrated in FIG. 5. FIG. 8 is a diagram illustrating a modification of the setting method of the torque rate of the first embodiment. In the modification illustrated in the drawing, as the outputable power becomes larger, the torque rate is decreased one or a plurality of times in a stepwise manner. According to the control like this, a control configuration can be simplified more than the control that changes the torque rate continuously.

Figure 9:
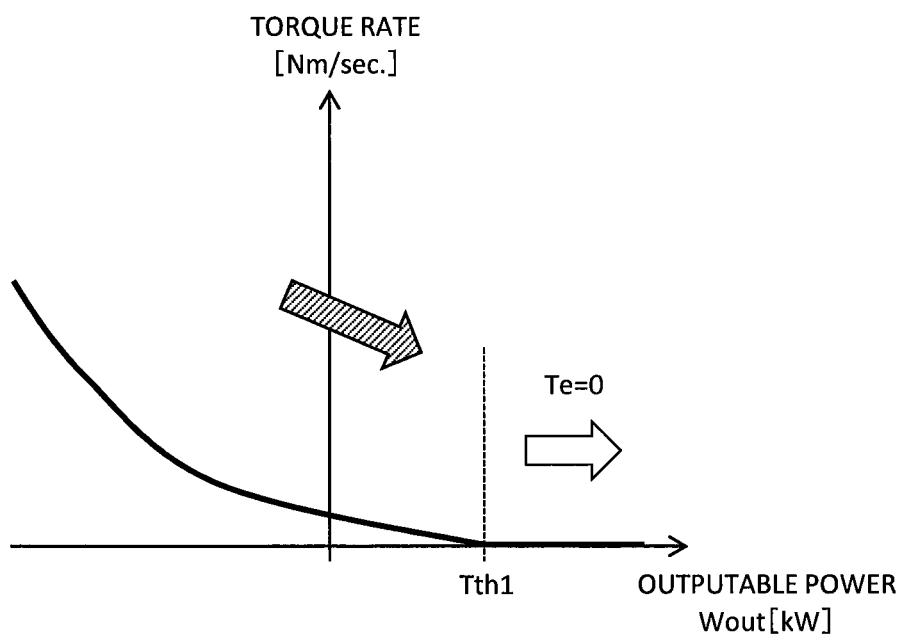
FIG. 9 is a diagram illustrating another modification of the setting method of the torque rate of the first embodiment.

FIG. 9 is a diagram illustrating another modification of the setting method of the torque rate of the first embodiment. In the modification illustrated in FIG. 9, the torque rate is gradually made smaller as the outputable power becomes larger. The torque rate is fixed to zero in a range where the outputable power becomes a predetermined value Tth1 or more. As the prescribed determination value Tth1, a value fixed in advance by an experiment or the like is used as a threshold of the outputable power capable of realizing the request driving force by only the motor torque Tm. According to the control like this, in the range of the outputable power capable of realizing the request driving force by only the motor torque Tm, it becomes possible to perform travel with priority being put on the acceleration performance of the vehicle by EV (electric vehicle) travel using only the motor torque Tm.

Figure 10:
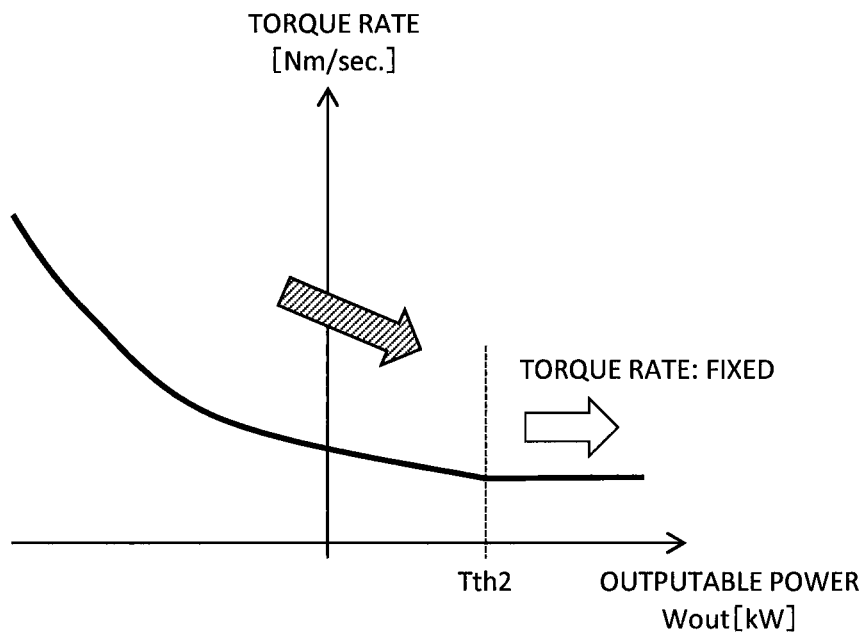
FIG. 10 is a diagram illustrating another modification of the setting method of the torque rate of the first embodiment.

FIG. 10 is a diagram illustrating another modification of the setting method of the torque rate of the first embodiment. In the modification illustrated in FIG. 10, the torque rate is made gradually smaller as the outputable power becomes larger, and in a range where the outputable power becomes a predetermined value Tth2 or more, the torque rate is set as a fixed positive value. According to the control like this, the engine torque Te can be always used, so that effective control is provided in the system on the premise that the engine 2 is always used.

Figure 11:
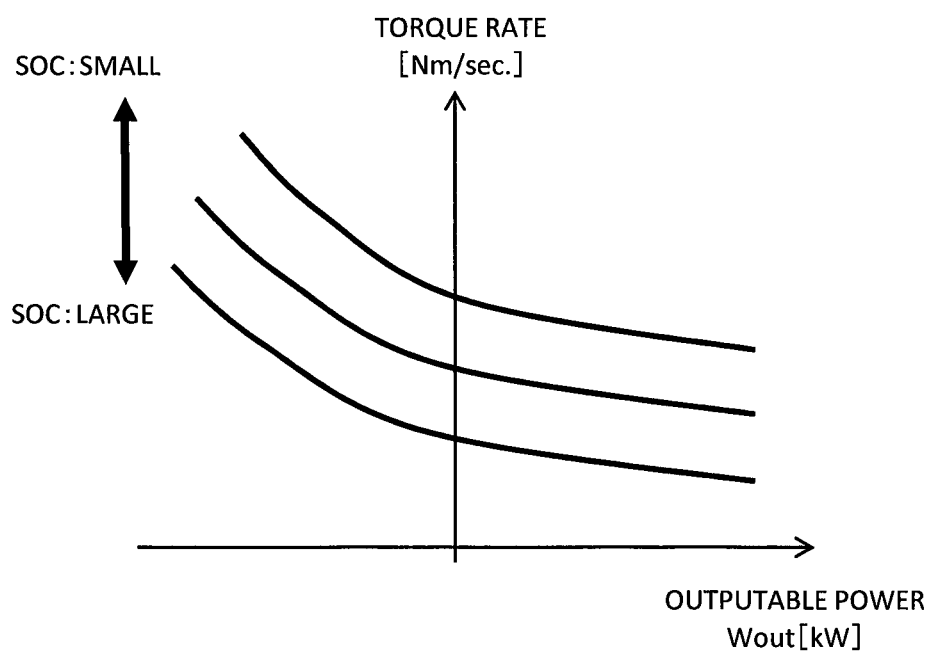
FIG. 11 is a diagram illustrating another modification of the setting method of the torque rate of the first embodiment.

FIG. 11 is a diagram illustrating another modification of the setting method of the torque rate of the first embodiment. In the modification illustrated in FIG. 11, the torque rate is set by further using the battery state of charge (SOC) in addition to the outputable power. More specifically, in the modification illustrated in FIG. 11, the relationship of the torque rate to the outputable power is specified for each SOC. As the SOC is larger, the outputable power of the battery 16 tends to increase. Therefore, according to the control like this, it becomes possible to optimize the torque rate corresponding to the output characteristic of the battery 16.

Figure 12:
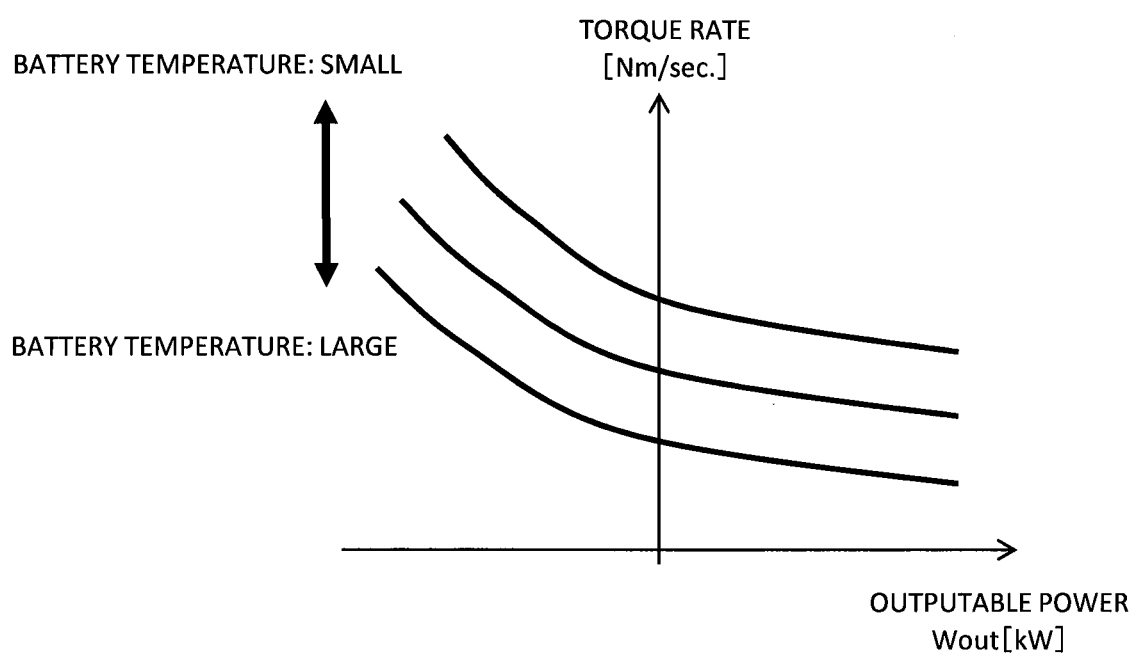
FIG. 12 is a diagram illustrating another modification of the setting method of the torque rate of the first embodiment.

FIG. 12 is a diagram illustrating another modification of the setting method of the torque rate of the first embodiment. In the modification illustrated in FIG. 12, the torque rate is set by further using the battery temperature in addition to the outputable power. Specifically, in the modification illustrated in FIG. 12, relationship of the torque rate to the outputable power is specified for each battery temperature. As the battery temperature is larger, the outputable power of the battery 16 tends to increase. Therefore, according to the control like this, it becomes possible to optimize the torque rate corresponding to the output characteristic of the battery 16.

What is claimed is:

1. A control system of a hybrid vehicle comprising:
an internal combustion engine loaded on a vehicle;
an electric motor loaded on the vehicle and connected to wheels via a power transmission mechanism;
a battery that stores power that drives the electric motor; and
a control device that controls engine torque generated by the internal combustion engine, and motor torque that is transmitted to the wheels by the electric motor, based on a request driving force requested for the vehicle,
wherein the control device is configured to:
calculate an outputable power of the battery based on a temperature of the battery and a state of charge of the battery,
calculate a torque rate of the engine torque based on the calculated outputable power of the battery, so that the torque rate of the engine torque is larger when the outputable power belongs to a predetermined low power region than when the outputable power belongs to a high power region with a higher power than the low power region,
calculate a target engine torque using the calculated torque rate,
calculate a target motor torque by subtracting the calculated target engine torque from the request driving force,
control the engine torque using the calculated target engine torque, and
control the motor torque using the calculated target motor torque.

2. The control system of a hybrid vehicle according to claim 1,
wherein the control device is configured to compensate torque, which becomes insufficient by the engine torque, by the motor torque so that a driving force of the vehicle is brought to the request driving force.

3. The control system of a hybrid vehicle according to claim 1,
wherein the battery has a characteristic in that as the temperature of the battery becomes higher, the outputable power has a larger value.

4. The control system of a hybrid vehicle according to claim 1,
wherein the battery has a characteristic in that as the state of charge of the battery is larger, the outputable power has a larger value.

5. The control system of a hybrid vehicle according to claim 1,
wherein the control device is configured to make the torque rate of the engine torque smaller when the outputable power is larger than a prescribed determination value than when the outputable power is smaller than the determination value.

6. The control system of a hybrid vehicle according to claim 1,
wherein the control device is configured to make the torque rate of the engine torque smaller as the outputable power becomes larger, in a non-stepwise manner.

7. The control system of a hybrid vehicle according to claim 1,
wherein the control device is configured to make the torque rate of the engine torque be a fixed positive value when the outputable power is larger than a prescribed determination value.

8. The control system of a hybrid vehicle according to claim 1,
wherein the control device is configured to fix the torque rate of the engine torque to zero when the outputable power is larger than a prescribed determination value.

* * * * *